United States Patent

McCann

[15] 3,691,217

[45] Sept. 12, 1972

[54] PROCESS FOR THE PREPARATION OF ACYL CHLORIDES AND BENZALDEHYDES

[72] Inventor: Thomas J. McCann, Brooklyn, N.Y.

[73] Assignee: Argus Chemical Corporation, Brooklyn, N.Y.

[22] Filed: March 16, 1970

[21] Appl. No.: 20,142

[52] U.S. Cl............260/408, 260/544 L, 260/544 M, 260/544 Y, 260/599, 260/966
[51] Int. Cl................................................C11c 3/100
[58] Field of Search.......................260/408, 544, 599

[56] References Cited

UNITED STATES PATENTS 1,921,767  8/1933  Mills..........................260/544
2,525,723  10/1950  Rabjohn....................260/544

Primary Examiner—Lewis Gotts
Assistant Examiner—Catherine L. Mills
Attorney—Janes & Chapman

[57] ABSTRACT

A catalytic process is provided for the preparation of benzoyl chlorides and benzaldehydes comprising reacting benzo polychloromethanes with an organic carboxylic acid to produce the corresponding benzoyl chloride or benzaldehyde plus the acyl chloride corresponding to the organic carboxylic acid, the reaction being carried out in the presence of a tin chloride catalyst.

23 Claims, No Drawings

PROCESS FOR THE PREPARATION OF ACYL CHLORIDES AND BENZALDEHYDES

Aroyl and acyl chlorides, such as benzoyl chloride and acetyl chloride, are useful in medicine, and further as intermediates in the manufacture of the corresponding acids, peracids and esters.

The acid chlorides have generally been made by the reaction of phosphorus trichloride or pentachloride with a carboxylic acid. This reaction is favored commercially because of the greater economy which can be achieved in conversion and yield in relation to the cost of the reactants. However, phosphorus impurities should be removed from the reaction product, since they can interfere with the use of the product, and this removal is not easy. Hence, efforts have been made to develop a better process, but these have been unsuccessful, except in the laboratory.

Benzoyl chloride can be prepared by the partial hydrolysis of benzotrichloride

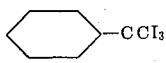

to remove two chlorines and substitute carboxyl oxygen in the presence of sulfuric acid or a metal halide such as ferric chloride ($FeCl_3$) and water. Benzotrichloride has also been partially hydrolyzed by reacting at 240° C with water vapor in the presence of tin phosphate. See Huntress, Organic Chlorine Compounds, John Wiley & Sons (New York, 1948), pp. 880–881.

Jacobson, German Pat. No. 11494 (1879), describes the reaction of benzotrichloride as well as of benzal chloride and a carboxylic acid in the presence of $ZnCl_2$, $SbCl_3$ or $CuCl_2$, forming the corresponding acyl chloride, and benzoyl chloride or benzoic acid or benzaldehyde, respectively, according to the catalyst used.

U.S. Pat. Nos. 1,963,748 and 1,963,749 to Kyrides, patented Apr. 28, 1930, suggested that polyvalent alkaline earth metal salts and especially the chlorides, oxides and hydroxides of zinc, aluminum, chromium and copper, catalyzed the reaction of benzotrichloride with dicarboxylic acids or their anhydrides, such as phthalic anhydride or phthalic acid to form benzoyl chloride, among other things.

U.S. Pat. No. 1,921,767, to Mills, dated May 20, 1929, suggests that the chlorides of cobalt, antimony, copper and bismuth catalyze the reaction of benzotrichloride and an aliphatic acid such as acetic acid.

U.S. Pat. No. 1,965,556, to Mills, dated July 3, 1934, discloses reaction of an aliphatic acid, such as acetic acid, and benzotrichloride in the presence of zinc chloride at temperatures of from 100° to 110° C, to obtain a mixture of benzoyl chloride and the corresponding acetyl chloride.

German Pat. No. 804,567 (1951) describes preparation of acyl halides by reacting lactones with non-metallic polyhalogenated compounds, e.g., $C_6H_5CCl_3$ or $C_6H_5CHCl_2$ in the presence of catalysts, i.e., $H_2SO_4$, $ZnCl_2$ and $FeCl_3$ or Zn dust.

Johnson, German Pat. No. 574,836 (1931), British Pat. No. 384,722, French Pat. No. 739,290, prepare sulphonic acid chlorides by reacting $C_6H_5CCl_3$ with the corresponding sulphonic acid sodium salt. No catalyst was used. Fumaric acid and benzotrichloride have been reacted in the absence of any catalyst at from 140° to 170° C to produce benzoyl chloride, according to U.S. Pat. No. 1,793,917 to Faber, dated Feb. 24, 1931.

British Pat. No. 1,148,782 prepares benzoyl chloride by the pressure reaction of benzoic acid with $CCl_4$ in the presence of $FeCl_3$.

British Pat. No. 1,159,266 describes the preparation of acyl halides by the reaction of carboxylic acids with phosgene in the presence of a quaternary ammonium, phosphonium or ternary sulphonium salt.

Netherlands Pat. publication No. 68.14725 discloses the reaction of a carboxylic acid with hexachloropropene, forming the corresponding acylchloride and trichloroacryloyl chloride. Suggested catalysts are $ZnCl_2$, $FeCl_3$ or $I_2$.

McKee German Pat. No. 540,588 describes the preparation of fumaryl-and benzoyl chloride by the reaction of $C_6H_5CCl_3$ and fumaric acid in the presence of iron powder.

None of these has been successful, because inter alia of the low yields and conversions generally obtained, and the resulting high cost and low purity of the product. In some cases, the starting materials cost more than the reaction products, and in others the price differential is too small to justify the cost of the process.

In accordance with the present invention, it has now been discovered that the reaction of a benzo polychloromethane with an organic carboxylic acid can be efficiently carried out in the presence of a tin halide, to obtain the acid chloride corresponding to the carboxylic acid and benzoyl chloride or benzaldehyde, in high yield and purity. The reaction can be carried out at a lower temperature than with zinc chloride, and, as a result, there is less decomposition or degradation. Reaction at the lower temperatures proceeds at a high rate, and favors the formation of the acyl and benzoyl chlorides or benzaldehyde, while inhibiting formation of other by-products or tarry residues and suppressing (as is particularly the case for $ZnCl_2$ catalyst) the formation of substantial amounts of anhydride.

The reaction can be defined by the following scheme:

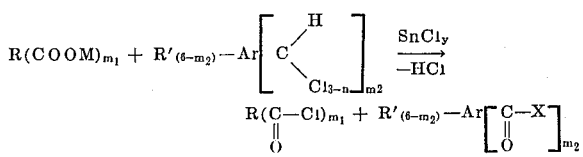

In the above formulas,

R is a hydrocarbon group or a hydrocarbon group having one or more inert substituents, R' is selected from hydrogen, halogen, alkoxy, hydrocarbon, and hydrocarbon having one or more inert substituents.

Ar is a benzene ring, and can include one or more benzene rings linked by carbon-to-carbon bonds as in diphenyl or by an inert bridging radical, M is hydrogen or a salt-forming cation, X is hydrogen or chlorine, $m_1$ is a number from one to six and represents the number of —COOH groups, $m_2$ is a number from one to six, n is a number from zero to one, y is two or four.

The process is applicable to organic carboxylic acids $R(COOH)_{m_1}$ having from one to six carboxylic acid groups, with not more than one carboxylic acid group per carbon atom, and having from two to about 51 carbon atoms. Thus, R has from one to about 50 carbon atoms.

R is a saturated or unsaturated aliphatic, aromatic or cycloaliphatic hydrocarbon group, such as alkyl, cycloalkyl, alkenyl, alkynyl, cycloalkyl, cyclokenyl, phenyl, biphenyl, naphthyl, benzyl, or phenethyl, or a heterocyclic group containing one or more nitrogen, oxygen or sulfur hetero atoms, singly or in combinations, and such groups substituted with inert groups such as halogen, oxyether or thioether groups, sulfonyl groups, carbonyl groups, ester groups or nitro groups. Preferably, R has from one to 30 carbon atoms and one or two carboxylic acid groups.

The reaction proceeds preferentially with carboxylic acid groups that form noncyclic anhydride, acid halide or aldehyde groups. Thus, if there are more than two carboxylic acid groups, of which two are capable of forming a cyclic anhydride, and the others are not, the former carboxylic acid groups are substantially less reactive and the reaction proceeds preferentially with the latter carboxylic acid groups in the molecule which do not form the cyclic anhydride, until these have been converted to acid halide groups. Hence, by limiting proportions of benzopolychloromethane, it is possible to limit the reaction to the latter.

R' is selected from hydrogen, halogen, alkoxy, saturated or unsaturated aliphatic, aromatic or cycloaliphatic hydrocarbon, such as alkyl, alkynyl, cycloalkyl, alkenyl, alkylcycloalkyl, cycloalkenyl, phenyl, biphenyl, naphthyl, benzyl, or phenethyl, or a heterocyclic group containing one or more nitrogen, oxygen or sulfur hetero atoms, singly or in combinations, and such groups substituted with inert groups such as halogen, oxyether, thioether, sulfonyl, carbonyl, ester or nitro groups. Preferably, R' has from one to 30 carbon atoms, when R' is an organic group.

Examples of monocarboxylic acids include acetic acid, n-butyric acid, isobutyric acid, 3-nitropropionic acid, cyano-acetic acid, n-butyric acid, isobutyric acid, n-valeric acid, n-hexanoic acid, 2-methyl hexanoic acid, heptanoic acid, octanoic acid, 2-ethyl hexanoic acid, nonanoic acid, pentadecanoic acid, capric acid, undecanoic acid, lauric acid, myristic acid, palmitic acid, caprylic acid, arachidic acid, palmitic acid, margaric acid, stearic acid, stearolic, tetrolic, propiolic acids, acrylic acid, crotonic acid, 3-methyl crotonic acid, isocrotonic acid, vinyl acetic acid, angelic acid, 3-butenoic acid, 3-hexenoic acid, 4-heptenoic acid, 5-octenoic acid, 4-methylene-2-nonenoic acid, 2-ethylidene hexanoic acid, pentadecenoic acid, sorbic acid, arachidonic acid, linoleic acid, linolenic acid, benzoic acid, toluic acid naphthoic acid, 2,4-dimethyl benzoic acid, p-iodobenzoic acid, m-bromobenzoic acid, 2,4-, 2,5-, 2,6- or 3,4-dichlorobenzoic acid, 3,4,5-trifluorobenzoic acid, cyclohexane carboxylic acid, cycloheptane carboxylic acid, cyclobutane carboxylic acid, methyl cyclopropane carboxylic acid, 2-methyl cyclohexane carboxylic acid, 2-norbornanecarboxylic acid, phenyl acetic acid, phenyl butenoic acid, phenyl propanoic acid, cinnamic acid, phenyl propionic acid, pyrrole-2-carboxylic acid, nicotinic acid, quinaldic acid, 3-butynoic acid, monoethyl adipate, isobutyl benzoic acid, ethylbenzoic acid, isopropylbenzoic acid, p-t-butylbenzoic acid, n-hexylbenzoic acid, β-naphthoic acid, β-naphthalene acetic acid, orthobenzoyl benzoic acid, naphthenic acids derived from petroleum, abietic acid, dehydroabietic acid, methyl furoic acid, thienoic acid, monochloroacetic acid, bromoacetic acid, 2-bromoisovaleric acid, iodoacetic acid, dichloro- and trichloroacetic acids, α-chloropropionic acid, β-chloropropionic acid, β-chlorocaproic acid, and dodecyl thioether propionic acid $(C_{12}H_{25}—S—(CH_2)_2—COOH)$.

Exemplary dicarboxylic acids include isophthalic acid, terephthalic acid, naphthalic acid, 3,5-pyridinedicarboxylic acid, 3,5-quinoline dicarboxylic acid, adipic acid, pimelic acid, suberic acid, azelaic acid, sebacic acid, glutaconic acid, octenedioic acid, undecanedioic acid, thiodipropionic acid, cyclohexane1,4-dicarboxylic acid, and acetylene dicarboxylic acid.

The higher polycarboxylic acids include trimellitic acid, 1,3,5-pentanetricarboxylic acid, 1,2,4-hexanetricarboxylic acid, 5-octene-3,3,6-tricarboxylic acid, 1,3,5-benzenetricarboxylic acid, and 1-(2-carboxyethyl)-2,3-naphthalenediacetic acid.

Metal salts (M is a salt-forming cation) of the organic carboxylic acids are also reactive in this process, especially the alkali metal salts such as sodium and potassium, and the alkaline earth metal salts, such as calcium and barium. In this case, the reaction product is the metal chloride in place of hydrogen chloride; the metal chloride precipitates out as a salt, rather than being expelled as a vapor overhead.

The benzopolychloromethane has at least one six-membered carbocyclic aromatic ring, up to four such rings, and one or more of the rings can be substituted by an inert substituent or by additional polychloromethane groups ($CCl_3$ and $CHCl_2$). Thus, the benzopolychloromethane has the formula:

II.

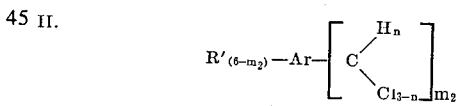

where Ar is the aromatic carbocyclic nucleus and R', $m_2$ and n are as in I, above.

Ar is usually a benzene ring

but it can also have two or more linked benzene rings, as in and

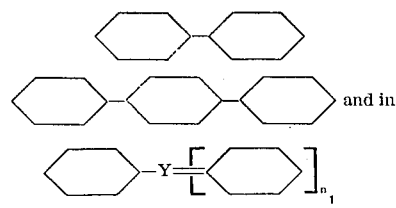

and in where Y is a linking nucleus, such as

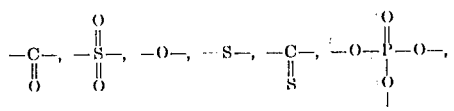

$n_1$ being equal to the valence of Y, and being one or two. Ar can also have condensed aromatic nuclei, as in naphthalene

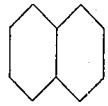

and anthracene

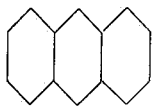

and phenanthrene

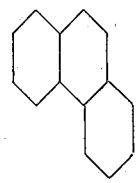

The polychloromethane group has two or three chlorine atoms, and is either —CHCl$_2$ or —CCl$_3$.

Each polychlormethane side-chain can react with an active carboxyl group in the organic carboxylic acid, so that the stoichiometric quantities of each of the reactants are determined by the number of such active groups present in each molecule that is to be reacted.

Examples of benzopolychloromethanes include 3-methylbenzotrichloride, 2,5-dimethyl-benzotrichloride, 4-butyl-benzotrichloride, 4,4'-oxybis(benzotrichloride), 4,4'-carbonyl-bis(benzotrichloride), 4,4'-sulfonyl-bis(benzotrichloride), 2-propyl-benzotrichloride, 2-(3-butenyl)-benzotrichloride, 4-phenyl-benzotrichloride, 2-methyl-4-trichloromethyl-benzotrichloride, 4-chlorobenzotrichloride, 3-bromobenzotrichloride, 4-methoxy-benzotrichloride 2-bromomethyl-benzotrichloride, 4-cyclohexylbenzotrichloride, 4-nitrobenzoylidenechloride, 3,5-trichloromethyl-benzotrichloride, 3-trichloromethylethylbenzoate, benzylidene chloride, 4-t-butylbenzylidene chloride, tri(dichloromethylphenyl) phosphate, and 2-acetoxybenzylidenechloride. Mixtures of —CHCl$_2$ and —CCl$_3$ compounds such as those resulting from the side-chain chlorination of xylene with three to six moles of chlorine, can be used without separation.

The reaction should be carried out at a temperature high enough to initiate the reaction and maintain the reaction at the desired rate, but below the degradation temperature of any of either the reactants or the products of this process. Generally, the temperature is within the range from about 40° to about 170° C., and preferably from about 80° to about 140° C.

Pressure has no noticeable effect. Hydrogen chloride is liberated and volatilizes at atmospheric pressures at the temperature at which the reaction proceeds, unless salt formation prevents this. A vacuum withdrawal system is unnecessary, but can be used if desired.

The reaction is preferably carried out under anhydrous conditions, to prevent hydrolysis of the reactants or products. A dry inert atmosphere or other anhydrous atmosphere, such as nitrogen, preferably at a slight positive pressure above ambient, is therefore useful to ensure against any leakage of moisture into the reaction system.

Active sites, especially any ethylenic groups, or ester groups in carboxylic acid or on any substituent of the benzopolychlormethane are sometimes partially halogenated or hydrolyzed in the course of the reaction, due apparently to reaction with hydrogen chloride liberated in the course of the reaction. To avoid this the reaction is preferably carried out in the presence of an inert diluent or carrier, which increases the rate of removal of hydrogen chloride from the reaction site. Optimally, the hydrogen chloride is removed substantially as soon as it is formed, thus preventing any side-reaction with the reactants or reaction product. The inert diluent should boil at a temperature and pressure above or at that at which the reaction is carried out, and is preferably a solvent for the reactants. Examples of inert solvents include trichloroethane, perchlorethylene, octane, petroleum ether, naphtha, methyl cyclohexane and dioxane, benzene and toluene.

Alternatively, or in addition, a dry inert gas, such as dry nitrogen gas, can be used as a sweep, to aid in the removal of hydrogen chloride.

The reaction can be carried out by heating the reaction mixture under reflux, especially when the material being reacted includes an ethylenic bond or ester group which is susceptible to reaction with the hydrogen chloride evolved during the reaction process. The use of a solvent under reflux acts as a sweep to speed up the removal of the hydrogen chloride, generally removing the hydrogen chloride as it is formed. The solvent and any reactant or product that volatilizes are condensed under reflux and returned to the reaction mixture. The HCl is not condensed but is removed as vapor. Any product distilled off can be condensed and removed at this stage. This is especially useful in a continuous process.

The amount of inert solvent present should be enough to act as a sweep and can be within the range from about 5 to about 70 percent by weight of the reaction mixture.

The reaction will generally be completed at the preferred temperatures within from about 1 to about 3 hours; usually from 1 to 3 hours is sufficient to obtain at least an 80 percent yield of the desired acyl chloride.

The reactants can be added in stoichiometric quantities. However, an excess of either of the reactants is not detrimental. The process can be carried out as a batch process or as a continuous process, where the reactants are continuously fed and the reaction products are continuously removed from the reaction system.

If a metal salt of the organic carboxylic acid is a reactant, the by-product is the metal chloride, instead of hydrogen chloride, and the metal chloride precipitates from the reaction mixture. Although the solid metal chloride is removed in an additional separation step, e.g., filtration or decantation, the salt can be especially useful with very sensitive unsaturated compounds or esters, to avoid halogenation or hydrolysis of the products by HCl.

If the polychloromethane reactant is a benzotrichloride, the product of this reaction can be a mixture of two acyl chlorides: one, the aroyl chloride corresponding to the benzotrichloromethane, e.g., benzoyl chloride; the second, the acyl chloride corresponding to the organic carboxylic acid, e.g., lauroyl chloride. A single reaction product is obtained when the carboxylic acid has the same organic group as is present in the benzotrichloride. For example, the reaction between benzotrichloride and benzoic acid yields benzoyl chloride. If the benzopolychloromethane is a benzylidene chloride, the reaction with the carboxylic acid yields the benzaldehyde and the carboxylic acid chloride.

Generally, when a mixture of materials is formed, e.g., as in the reaction between lauric acid and benzotrichloride to form a mixture of lauroyl chloride and benzoyl chloride, the products can be separated to obtain the individual compounds. Usually, this can most readily be accomplished by fractional distillation, especially if the boiling points of these two products are relatively far apart. A sufficient range of starting materials is available so that for any desired acyl chloride or aldehyde the reactants for this process can be selected to form acyl chlorides whose boiling points are sufficiently far apart to make it possible to carry out the separation by fractional distillation. For example, mixtures of benzotrichloride and lauric acid or benzotrichloride and adipic acid both form mixtures of reaction products that can be readily separated by fractional distillation. 2-Ethylhexanoic acid and p-t-butyl-benzotrichloride are another convenient pair of reactants for easy separation by distillation. Of course, where a mixture of the two acyl chlorides can be tolerated, e.g., toluyl chloride and benzoylchloride, separation is unnecessary.

The tin chloride that is added can be either stannic or stannous chloride. It is believed that the actual catalyst is stannic chloride, but that under the conditions of the reaction mixture, any stannous chloride is oxidized to the stannic chloride, which then serves as the catalyst for the reaction. In any case, either of these is effective.

The tin chloride, i.e., $SnCl_2$ or $SnCl_4$, is preferably in a catalytic amount within the range from about 0.1 to about 2.5 percent, based on the total weight of the reactants. However, more than 2.5 percent tin chloride does not usually affect the course of the reaction, and 10 percent or more can be used (although it is unnecessary) unless tar formation is increased.

In the following working Examples, the products were analyzed by gas-liquid chromatography and, unless otherwise stated, the reaction products isolated were free from any of the reactants, indicating complete conversion of the reactants.

The following Examples represent preferred embodiments of this invention.

EXAMPLE 1

The following reaction mixture was charged to a three-necked, 5-liter, round-bottom flask, equipped with a mechanical stirrer, thermometer and a reflex condenser:

| | | |
|---|---|---|
| Lauric acid | 1001.5 g. | (5.0 mols) |
| Benzotrichloride | 990.0 g. | (5.05 mols) |
| $SnCl_4$ | 10.3 g. | (0.04 mol) |

The reaction vessel was heated to 110° C. and maintained at that temperature for 1.5 hours. The reaction mixture was then fractionated using a 0.5 ft. Vigreux column.

At a pot temperature of 84° C. was an overhead vapor temperature of 74° C. at 12 mm pressure, a forerun of 20 grams was collected, comprising $SnCl_4$ and benzoyl chloride. At a pot temperature of 86° to 129° C. with a vapor temperature of 75° to 98° C. and 12 mm pressure, 685.7 grams of benzoyl chloride was collected. A third fraction was collected at a pot temperature of 134° to 139° C. and a vapor temperature of 128° to 132° C., consisting of 1041.4 grams of lauroyl chloride. A tarry residue, 55 grams, remained in the reaction flask.

The yield of benzoyl chloride was 705 grams, and of lauroyl chloride was 1,080 grams. Thus, a yield of 96.5 percent of theory for lauroyl chloride and of 97.5 percent for benzoyl chloride was realized.

EXAMPLE 2

A reaction flask equipped as in Example 1, was charged with 700 grams (5 mols) toluic acid, 990 grams (5.05 mol, 1 percent excess by weight) benzotrichloride, and 10.3 grams (0.04 mol) $SnCl_4$. The flask was heated to 100° C., and held at that temperature for 1.5 hours. The reaction mixture was then vacuum distilled at 19 mm.

A forerun of 50.5 g. was collected at a pot temperature of 104° C. to 106° C. and a vapor temperature of 100° C. which was primarily $SnCl_4$ and benzoyl chloride. The main cut collected at a pot temperature of 106° to 123° C., and a vapor temperature of 100° to 117° C. comprised 1,393 grams of a mixture of benzoyl and toluyl chloride; approximately 664 grams benzoylchloride (4.72 mols), and 728 grams toluyl chloride (4.72 mols).

This represents yields of 94 percent for toluyl chloride as well as 94 percent for benzoyl chloride. Approximately 57.8 grams of residue remained.

EXAMPLE 3

To a three-necked 500 ml. flask equipped as above was added 147 grams benzotrichloride (0.75 mol), 91.5 grams benzoic acid (0.75 mol) and 5.9 grams $SnCl_4$ (0.02 mol). The flask was heated to about 130° C., and held at that temperature for 1.5 hours. The hydrogen chloride evolution in this case began at room temperature, and halted before the 1.5 hours had passed. The reaction mixture was then distilled at 20 mm pressure at a pot temperature of 90° to 93° C.; the distillate consisted of 207.5 grams of benzoyl chloride, which is a yield of approximately 98.5 percent.

EXAMPLE 4

To a three-necked 500 ml. glass flask was added decanoic acid, 86 grams (0.5 mol); benzotrichloride, 97.75 grams (0.5 mol); and $SnCl_4$, 1.3 grams (0.005 mol). The flask was heated to 100° C. and held there for 1.5 hours; the reaction mixture was then distilled through a 0.5 ft. Vigreux column, at 10 to 15 mm, using the procedures set forth above. The product comprised 91 grams benzoyl chloride and 91 grams of decanoyl chloride, representing a yield of 100 percent for the benzoyl chloride and 96 percent for the decanoyl chloride.

EXAMPLE 5

The procedure of Example 1 is repeated substituting an equivalent molar amount of cyclohexane carboxylic acid in place of the lauric acid. A satisfactory yield of benzoyl chloride and cyclohexoyl chloride is obtained.

EXAMPLE 6

The procedure of Example 1 is repeated substituting an equivalent molar amount of 3-methyl benzotrichloride for the benzotrichloride. A satisfactory yield of 3-methyl benzoyl chloride and lauroyl chloride is obtained.

EXAMPLE 7

Thiodipropionic acid, 2.5 mols, is substituted for the 5 mols of lauric acid in the procedure of Example 1. A satisfactory yield of thiodipropionyl chloride and benzoyl chloride is obtained.

EXAMPLE 8

Adipic acid, 2.5 mols, is substituted for lauric acid in the procedure of Example 1. A satisfactory yield of adipoyl chloride and benzoyl chloride is obtained.

EXAMPLE 9

In the process of Example 1, $SnCl_2$ is substituted for $SnCl_4$, and the process is otherwise carried out in the same manner. Substantially the same yields of the lauroyl chloride and benzoyl chloride are obtained.

EXAMPLE 10

The following materials are charged to a three-necked 5-liter flask equipped as above: trimellitic anhydride (TMA), 960 grams (5 mols); benzotrichloride, 990 grams (5.05 mols); and $SnCl_4$, 10.3 grams (0.0398 mol).

The pot contents were heated to 105° C., at which point a heavy evolution of hydrogen chloride commenced and continued for 30 minutes. The temperature was then raised to 125° C. and held there for 1.5 hours.

The reaction mixture was then vacuum distilled. The cut going over at 78° to 83° C. at 10 mm pressure comprised 742.1 grams and consisted of 705 grams of benzoyl chloride, the unreacted excess of 10 grams benzotrichloride, 10 grams $SnCl_4$ and 17.1 grams 4-acid chloride of trimellitic acid. A second fraction was collected at a vapor temperature of 180° to 184° C. at 10 mm. pressure, and comprised 846.5 grams of the 4-acid chloride of trimellitic acid. The residue of 147 grams consisted mainly of the 4-acid chloride plus some tarry residue.

The yield of benzoyl chloride was 100 percent, and the yield of the 4-acid chloride was approximately 85 percent. The yield of the 4-acid chloride would have been higher except for the problem of separating out the remaining 4-acid chloride from the residue without degrading the material.

Accordingly, this test shows that in a polycarboxylic acid where two of the carboxyl groups come from a cyclic anhydride, the third group can be selectively and substantially quantitatively reacted with a benzotrichloride, to the exclusion of the cyclic anhydride groups, which behave as though they were inert.

EXAMPLE 11

To a three-necked 5-liter flask equipped as above was added crotonic acid, 215 grams (2.5 mols); benzotrichloride, 495 grams (2.525 mols); $SnCl_4$, 5.15 grams (0.0195 mol); and benzene, 612.5 grams. The flask was heated under reflux for 2.5 hours at 89° to 94° C. Following this, the material was fractionated through a 13-inch Vigreux column at atmospheric pressure, at a vapor temperature of 80° to 132° C., to give 825 grams of distillate. A pot residue of 408 grams remained. The distillate was a mixture of benzene, crotonyl chloride and $SnCl_4$. The pot residue contained some tarry material, benzoyl chloride and the excess unreacted benzotrichloride.

There was substantially complete conversion of the crotonic acid and benzotrichloride to the benzoyl chloride and crotonyl chloride, respectively. There was substantially no chlorination of the unsaturated carbon-carbon link in the crotonyl group.

The same reaction carried out in the absence of benzene resulted in the formation of a substantial quantity of 3-chlorobutyryl chloride, about 20 mol percent of the product, which was distilled off together with crotonyl chloride.

A similar reaction was carried out utilizing a dry nitrogen gas sparge. To a 500 ml. three-necked glass flask was added crotonic acid, 43 grams (0.5 mol); benzotrichloride, 97.75 grams (0.5 mol); and $SnCl_4$, 1.3 grams (0.005 mol). The reaction product was heated to 85° C. and held there for 1.5 hours during which time dry nitrogen was passed through the reaction vessel above the reaction mixture. The product contained 11.75 percent chlorinated crotonyl chloride and 88.5 percent crotonyl chloride. This shows a significant reduction in the amount of hydrochlorination of the unsaturated chain linkage.

The benzene acting as a diluent and as a carrier to aid in the removal of the HCl as it is formed substantially eliminates the problem of hydrochlorination of the unsaturated carbon-to-carbon linkages, whereas the use of a nitrogen gas sparge to remove the hydrogen chloride is not quite as effective, as seen above.

EXAMPLE 12

The reaction flask was charged with the following reactants: 790 grams pelargonic acid (5.0 mols), 990 grams benzotrichloride (5.05 mols), and 10.3 grams $SnCl_4$ (0.0398 mol). The reaction mixture was heated to 100° C. for 1.5 hours. The reactants were completely converted, i.e., the reaction product (96 percent weight yield of mixed acid chlorides) was analyzed by gas-liquid chromatography, and was found to contain 65 percent benzoyl chloride and 35 percent pelargonoyl chloride, which was a satisfactorily high yield of the desired reaction product. In this Example, the products had extremely close boiling points, and separation by distillation would have been difficult to achieve.

EXAMPLE 13

In a 500 ml. three-necked flask was placed fumaric acid, 58 grams (0.5 mol); benzotrichloride, 195.5 grams (1.0 mol); and $SnCl_4$, 2.6 grams (0.01 mol). The mixture was heated to 130° C. and held at that temperature for 1.75 hours. Gas-liquid chromatography showed that there remained approximately 10 percent unreacted benzotrichloride.

EXAMPLE 14

The procedure for Example 1 is repeated, substituting an equivalent molar amount of myristic acid in place of the lauric acid. A satisfactory yield of benzoyl chloride and myristoyl chloride is obtained.

EXAMPLE 15

The procedure of Example 1 is repeated, substituting an equivalent molar amount of 2,4-dichlorbenzotrichloride for the benzotrichloride and pelargonic acid for the lauric acid. A satisfactory yield of 2,4-dichlorobenzoyl chloride and pelargonic chloride is obtained and separated by fractional distillation under vacuum.

EXAMPLE 16

Benzylidene chloride 80.5 g (0.5 mole) propionic acid 37 g. (0.5 mole) and stannic chloride 1.3 g. (0.005 mole) were stirred and heated for one and one-half hours at 100° C. in a reaction flask equipped as in Example 1. Analysis of the reaction mixture by gas chromatography and comparison with known samples showed that 2 percent or less of the benzylidene chloride and propionic acid starting materials remained, that benzaldehyde and propionyl chloride had been formed in high yield, and that no extraneous compounds had been formed.

EXAMPLE 17

Tris (2-dichloromethylphenyl) phosphate, melting point 75° C., was obtained from the chlorination of tri-o-tolylphosphate at 165°–170° C. for 16 hours.

The phosphate (5.72 g., 0.01 mole), propionic acid (2.22 g., 0.03 mole) and stannic chloride (0.078 g., 0.0003 mole) were heated one and one-half hours at 100° C. Hydrogen chloride was evolved. Vacuum was applied at 100° C. to remove volatile materials including propionyl chloride and unreacted propionic acid. The residue of tris (salicylaldehyde) phosphate was a brown oily liquid; it was characterized by conversion to the semicarbazone melting point 130°–134° C. by warming with semicarbazide hydrochloride in aqueous methanol. The semicarbazone was free of chlorine; its infrared spectrum exhibited characteristic absorption peaks of P=O and P-O-aromatic groups and was consistent with the assigned structure.

EXAMPLE 18

Benzotrichloride (99 g. 0.5 mole), methacrylic acid (43 g, 0.5 mole), stannic chloride (1.3 g, 0.005 mole) and methylhydroquinone polymerization inhibitor (0.004 g) were stirred and heated one and one-half hours at 100° C. in a reaction flask equipped as in Example 1. Analysis of the reaction mixture by gas chromatography and comparison with known samples showed that 2 percent or less of the benzotrichloride and methacrylic acid starting materials remained, that benzoyl chloride and methacryloyl chloride had been formed in high yield, and that a trace (2 percent or less) of 3-chloroisobutyryl chloride hydrochlorination product was the only extraneous compound formed.

EXAMPLE 19

The procedure of Example 18 was repeated with acrylic acid (36 g, 0.5 mole) in place of methacrylic acid. Analysis of the treated reaction mixture as above showed consumption of the starting materials to 2 percent or less, formation of benzoylchloride and acryloyl chloride containing approximately 20 percent 3-chloropropionyl chloride in good yield, and no extraneous compounds.

EXAMPLE 20

In each experiment 99 g benzotrichloride (0.505 mole), 100 g lauric acid (0.5 mole), and metal chloride as shown were heated together for one and one-half hours at 100° C. and analyzed by GLC. Where benzoyl chloride and lauroyl chloride were found present, they were isolated by distillation under reduced pressure. Results are tabulated:

| Run | Metal chloride | Benzoyl chloride yield, moles % of theoretical | Lauroyl chloride yield, moles % of theoretical | Comments |
|---|---|---|---|---|
| a | none | 0 | 0 | Starting material found unchanged |
| Ex. 20 | $SnCl_4$ 1.30 g. | 0.48 (96) | 0.45 (90) | — |
| b | $HgCl_2$ 1.35 g, | 0 | 0 | Starting material found unchanged |
| c | $MgCl_2$ 0.5 g. | 0 | 0 | " " |
| d | $AlCl_3$ 0.7 g. | 0 | 0 | " " |
| e | $MoCl_5$ 0.9 g. | 0 | 0 | " " |
| f | $C_4H_9SnCl_3$ 1.4 g. | 0.11 (22) | 0.03 (6) | — |
| g | $Bu_2SnCl_2$ 1.5 g. | 0 | 0 | Starting material found unchanged |
| h | $Bu_3SnCl$ 1.6 g. | 0 | 0 | " " |
| i | $SbCl_3$ 1.2 g. | 0.31 (62) | 0.075 (15) | Large distillation residue |
| j | $SbCl_5$ 105 g. | 0.245 (49) | 0.035 (7) | " " |
| k | $FeCl_3$ 0.8 g. | 0.455 (91) | 0.225 (45) | " " |
| l | $ZnCl_2$ 0.7 g. | 0.23 (46) | 0 | 37 37 |

Under conditions where $SnCl_4$ works very well, only the antimony chlorides and zinc and ferric chloride show any catalytic activity, and these chlorides at the same time cause considerable degradation of the desired fatty acid chloride so that their utilization is impractical.

In a further experiment with zinc chloride, the catalyst quantity for a run as shown was increased to 6.8 g and the heating period extended to 21 hours at 130° C. These conditions resulted in 66 percent yield of benzoyl chloride and zero yield of lauroyl chloride, along with a large distillation residue.

EXAMPLE 21

The following experiments were carried out to investigate whether the catalytic properties found with tin chlorides in bringing about the interaction of benzopolychloromethane with a carboxylic acid to give high yields of oxoarylmethane and carboxylic acid chloride could be duplicated with organic chlorine compounds other than benzo polychloromethanes.

In each experiment, 37 g propionic acid (0.5 mole), 1.3 g tin tetrachloride (0.005 mole) and the quantities of chlorine compound shown were heated at 100° C. for one and one-half hours and analyzed by gas chromatography. Only the peaks characteristic of the starting materials were observed.

| Run | Chlorine compound | | Comments |
|---|---|---|---|
| m | benzyl chloride | 64 g | |
| n | DDT | 179 g | DDT recovered by crystallization |
| o | hexachlorocyclohexane | 147 g | $C_6H_6Cl_6$ recovered by crystallization |

Each of these chlorine compounds is lacking a characteristic feature of the benzopolychloromethanes. Benzyl chloride has one chlorine instead of two or three; DDT is a benzopolychlorolethane, with the chlorinated side chain carbon separated from the aromatic ring by an intervening carbon atom; hexachlorocyclohexane is lacking the aromatic ring.

The acid chlorides and benzaldehydes that are obtained by the process of the invention are known compounds, and have known utilities, and accordingly form no part of the instant invention, which is concerned with a process for their preparation.

Acid chlorides are especially useful as intermediates for the formation of other commercially valuable compounds. For example, the acid chlorides can be used for the preparation of the corresponding organic peroxides by reaction with hydrogen peroxide or a metal peroxide, e.g., barium peroxide or sodium peroxide:

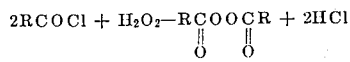

See Organic Peroxides, E.G.E.Hawkins, D.Van Nostrand Company, Inc. (Princeton, N.J., 1961).

Acid chlorides are also used to react with aminoacids such as glycine, sarcosine, N-methyl taurine, and beta-alanine in the synthesis of surface-active agents.

Benzaldehydes are also useful intermediates, and components of perfumes and aromatic oils and essences.

Having regard to the foregoing disclosure, the following is claimed as the inventive and patentable embodiments thereof.

1. A process for the preparation of aromatic acid chlorides and aldehydes and acyl chlorides, comprising reacting an organic carboxylic acid having carboxylic acid groups that form non-cyclic acid anhydride, acid halide, or aldehyde groups with a benzopolychloromethane having two or three chlorine atoms in the methane group in the presence of a stannic or stannous chloride at a temperature within the range from about 40° to about 170° C, limiting the proportions of benzopolychloromethane to limit reaction to said carboxylic acid groups to form acid chloride groups substantially to the exclusion of anhydride groups, and recovering from the reaction mixture the acid chloride of the organic carboxylic acid and the acid chloride or aldehyde of the benzopolychloromethane.

2. The process of claim 1 wherein the organic carboxylic acid has the formula $R(COOM)_{m_1}$ wherein R is selected from hydrocarbon groups and hydrocarbon groups bearing one or more inert substituents and having from one to about 50 carbon atoms, and $m_1$ is a number from one to about six, and M is hydrogen or a salt-forming cation, there being no more than one carboxylic acid group —COOM per R carbon atom.

3. The process of claim 2 wherein R is selected from the group consisting of aliphatic, aromatic, and cycloaliphatic hydrocarbon groups.

4. The process of claim 3 wherein R is a saturated aliphatic hydrocarbon group.

5. The process of claim 1 wherein the reaction is carried out under reflux in an inert solvent to remove hydrogen chloride.

6. The process of claim 1 carried out at a temperature of from about 80° to about 140° C.

7. The process of claim 1 wherein the tin chloride is in an amount within the range from about 0.1 to about 10 percent by weight of the reaction mixture.

8. The process of claim 1 wherein the reaction mixture is sparged with a nitrogen gas stream to remove hydrogen chloride.

9. The process of claim 1 wherein the benzopolychlormethane is a benzotrichloride.

10. The process of claim 1 wherein the benzopolychlormethane is a benzylidene chloride.

11. The process of claim 1 wherein the organic carboxylic acid is a polycarboxylic acid having at least two carboxylic acid groups reactive to form a cyclic anhydride, and the remaining carboxylic acid groups are selectively reacted with the benzpolychloromethane to form acid chloride groups while substantially excluding cyclic anhydride formation by the reaction of the carboxylic acid groups reactive to form a cyclic anhydride.

12. The process of claim 1 wherein the organic carboxylic acid is a monocarboxylic acid.

13. The process of claim 1 wherein the organic carboxyacid is a dicarboxylic acid.

14. The process of claim 1 wherein the reaction is carried out under substantially anhydrous conditions.

15. The process of claim 1 wherein the organic carboxylic acid is in the form of the alkali metal, or alkaline earth metal salt.

16. The process of claim 1 wherein the benzopolychloromethane and organic carboxylic acid both have the same hydrocarbon groups, to which the polychloromethane and the carboxylic acid groups are attached.

17. The process of claim 1 wherein the reaction products are separated from the reaction mixture by fractional distillation.

18. The process of claim 1 wherein the tin chloride is $SnCl_2$.

19. The process of claim 1 wherein the tin chloride is $SnCl_4$.

20. The process of claim 1 wherein the benzopolychloromethane has the formula:

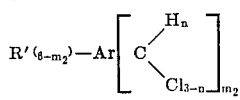

where R' is selected from hydrogen and halogen, alkoxy, hydrocarbon and hydrocarbon bearing one or more inert substituents selected from halogen, oxyether, thioether, sulfoxyl, carboxyl, ester or nitro, having from one to about 50 carbon atoms, Ar includes at least one aromatic six-numbered carboxylic ring, $m_2$ is a number from 1 to 6, and $n$ is zero to one.

21. The process of claim 20 wherein Ar is

22. The process of claim 20 wherein Ar is

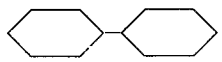

23. The process of claim 20 wherein Ar is

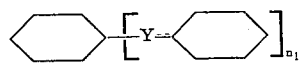

wherein Y is a linking nucleus selected from $$-\overset{\|}{\underset{O}{C}}-$$

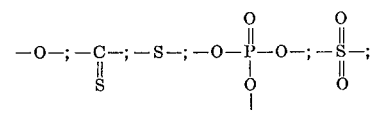

$n_1$ being one or two.

* * * * *